May 14, 1946. L. P. JOSSERAND Re. 22,756

THEATER

Original Filed Dec. 14, 1933 2 Sheets-Sheet 1

Inventor
LOUIS P. JOSSERAND.
Jesse R. Stone
Lester B. Clark

By

Attorneys.

May 14, 1946. L. P. JOSSERAND Re. 22,756

THEATER

Original Filed Dec. 14, 1933 2 Sheets-Sheet 2

Inventor
LOUIS P. JOSSERAND.
Jesse R. Stone
Lester B. Clark
By
Attorneys

Reissued May 14, 1946

Re. 22,756

UNITED STATES PATENT OFFICE 22,756

THEATER

Louis P. Josserand, Houston, Tex.

Original No. 2,102,718, dated December 21, 1937, Serial No. 702,294, December 14, 1933. Application for reissue December 19, 1939, Serial No. 311,064

2 Claims. (Cl. 20—1.12)

The invention relates to an improvement in the arrangement and construction of drive-in theater wherein the theater is so constructed that the patrons may drive their automobiles into the theater and observe the performance while seated in the automobile.

It is one of the objects of the invention to provide an efficient, economical, and convenient construction so that the greatest number of vehicles may be parked within a minimum area in order to provide a maximum of attendance.

Another object of the invention is to provide entry ways for the vehicles in such a manner that two rows of vehicles may be arranged adjacent each driveway.

Another object of the invention is to so concave the surface of the theater that each vehicle will have a clear view of the performance without interference by the rows of vehicles in front thereof.

Another object of the invention is to provide a drive-in theater wherein the entrance and exits are conveniently arranged with respect to the parking areas so that the minimum of disturbance will be created by vehicles entering and leaving the theater.

Other and further objects of the invention will be readily apparent when the following description is considered in connection with the accompanying drawings wherein.

Figure 1:
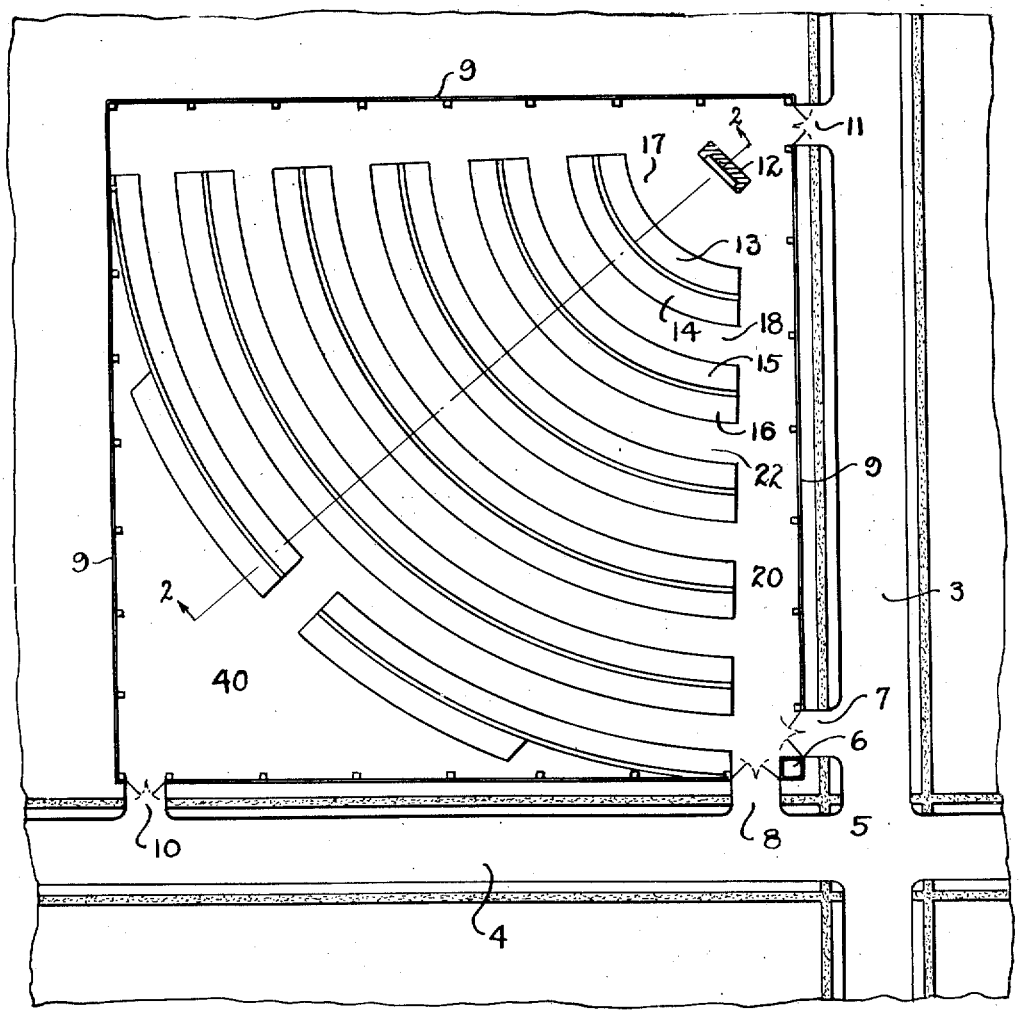
Fig. 1 is a top plan view of the theater showing the arrangement of the entrances and exits as well as the parking areas and driveways.

In Fig. 1 the location of the theater is illustrated as adjacent two intersecting streets such as 3 and 4, but it may be located otherwise if desired. With such a location, however, the entrance to the theater may be at the corner 5 so that only one box office 6 is necessary. The entrances are shown at 7 and 8, but only one entrance may be desired.

A suitable enclosure, such as a fence or shrubbery 9 may be arranged on all sides of the theater spaced so that only those entering the enclosure may observe the performance. Two exits 10 and 11 have been illustrated, one on each of the intersecting streets. In this manner the vehicles leaving the theater will not interfere with those entering the theater and a minimum of disturbance will be created by the moving vehicles.

The theater enclosure will be provided with a suitable stage or screen 12 from which the performance will be given. In event it is merely a moving picture theater the picture will be displayed on a screen on this stage. The projection room has not been illustrated but it is to be understood that it can be either in front or in back of the stage as desired.

Figure 3:
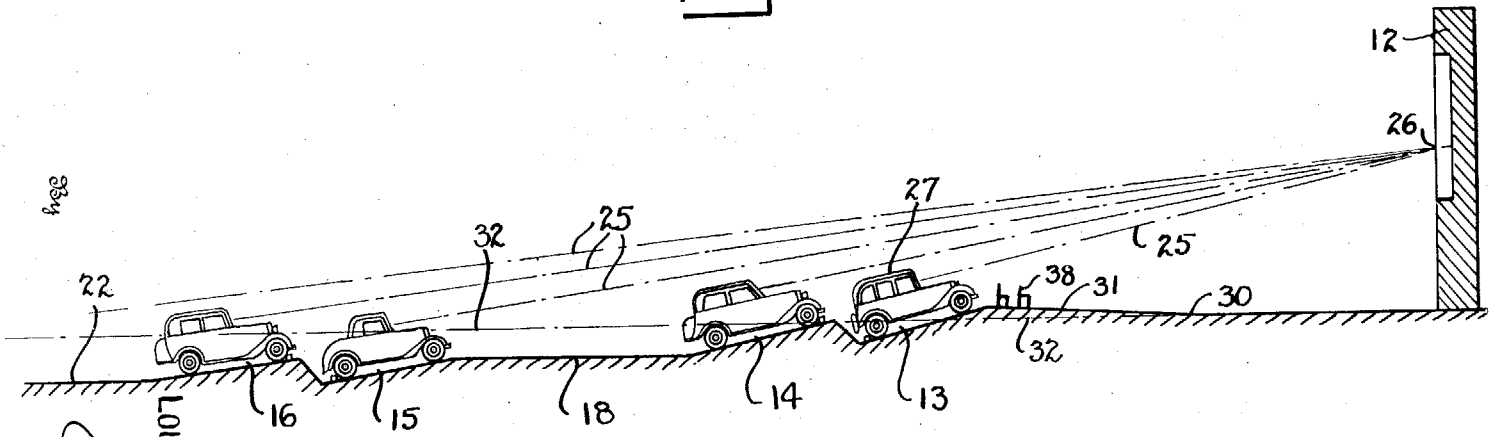
Fig. 3 is an enlarged vertical sectional view of one of the driveways and showing the vehicles parked in position to observe the performance.

Arranged in front of the stage 12 are the parking places such as 13, 14, 15, and 16. The number of these parking places will vary with the size of the theater desired. These parking spaces are shown as being curvilinear. The parking areas may be described as double parking areas such as 13 and 14. It is intended, however, that the vehicles in the parking area 13 will move into the parking position by passing in front of the parking area as at 17, and backing into the parking area such as best seen in Fig. 3; while the vehicles entering the parking area 14 will pass into the driveway 18, which is between the parking areas 14 and 15. As will be apparent, the vehicles after passing the box office will move along the side drive 20 until they arrive at the desired driveway, such as 18 or 22. The vehicles which intend to park in the area 14 will turn in the driveway 18 and move into the position shown in Fig. 3 by driving forwardly; whereas the vehicles which are to park in the area 15 will pass into the driveway and back into position.

While the entrance or exit of the vehicles through the driveways may interfere momentarily with the view of some of the patrons in the parked cars, such interference will be very slight because the sight lines, such as 25, extending to a position 26, which is slightly below the center of the stage 12, will pass above the top of the vehicles moving along the driveway, such as 18.

In arriving at the spacing of the parking areas 13, 14, 15 and 16, and the driveways therebetween, the height of present day vehicles has been very carefully considered and the inclination of the parking areas has been so calculated that the sight line from the center of the windshield of the vehicle in one row permits a clear line of vision over the top, such as 27, of the vehicles in the preceding parking areas.

Figure 2:
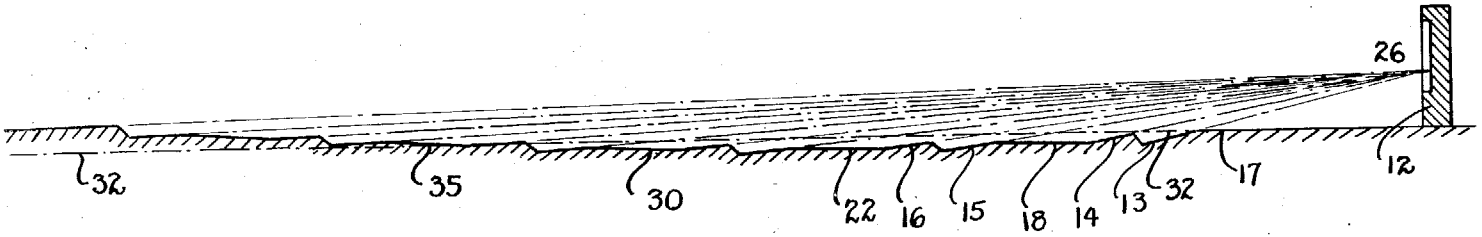
Fig. 2 is a section taken on the line 2—2 of Fig. 1 looking in the direction of the arrows and illustrating the general concaved arrangement of the parking areas and driveways.

As clearly observed in Figs. 2 and 3, the surface 30 of the theater has been inclined and divided into parking areas and driveways and so concaved that when sight lines from each parking area are drawn to converge at the point 26 each sight line will clear the top of the vehicles in the preceding parking areas. As best seen in Fig. 3, the first area 31 is inclined upwardly slightly with respect to the normal ground line 32. This normal ground line is shown as extending across both Figures 2 and 3 to indicate the concaved arrangement of the surface 30. The parking area 13 is shown as tipping quite sharply downward from the normal horizontal plane so that the sight line 25 from the focus point 26 will be parallel to the line of sight of a person seated in the vehicle. This makes a convenient and comfortable parking angle for the vehicle. The area 14 is shown as being inclined upwardly from the driveway 18 at such an angle that the sight line from the focus 26 is also parallel to the line of sight of persons seated in the vehicle. In order to accomplish this, however, the drive 18 is shown as being at an elevation somewhat below the ground line 32, because if the driveway 18 were on the level with the ground line, the cars in the rearward parking areas could not have a clear view of the screen. The parking area 15 is inclined downwardly in somewhat the same manner as the parking area 13 but at a somewhat lesser angle because this parking area is spaced further from the screen and the sight line clears the top of the vehicles in the parking area 14.

From Fig. 2 the general contour of the surface 30 will be observed as concaved and at substantially the point 35 the surface rises above the ground line 32. The inclination of the parking areas gradually decreases from the front of the theater toward the rear so that in all probability no two of the parking areas would be inclined at the same angle with respect to the horizontal.

In building a theater of this type it would be possible to use the earth removed in constructing the front part of the theater to be deposited in the back part of the theater so that the cut and fill would practically balance each other and no supply of earth from an outside source would be required. In this manner the theater could be constructed at a minimum cost and it would only be necessary to landscape the surface in accordance with the showing of these drawings.

While it is possible that the sight lines could be more closely spaced together; the arrangement has been such that the sight lines will be two feet six inches apart when measured at the windshield in any one parking area. In other words, there will be a two feet six inch clearance between the line of sight in one parking area and the line of sight in the next succeeding parking area. It is considered that this is sufficient to clear the top of the average vehicle now in use. With the trend, however, of lower vehicle bodies it is possible that as the higher cars gradually disappear a theater could be constructed with the sight line spaced a lesser distance apart and in this manner the inclination of the parking areas could be arranged at a lesser angle with respect to the horizontal. Any suitable inclination of the parking areas with respect to each other or the horizontal or with respect to the driveways may be arranged so that an unobstructed view of the stage may be had by the occupants of every vehicle.

The particular advantage of the present arrangement is that a maximum number of vehicles can be accommodated in a minimum of space, each driveway serving two parking areas and two parking areas being closely adjacent.

It is contemplated, of course, that if desired seats 38 may be placed in front of the parking area for such patrons as desire to leave their vehicles and observe the performance more closely. The area 40 behind the last parking area may be used to park vehicles where the patrons desire to be seated with friends in another vehicle or where the patrons desire to occupy the space in front of the parking area 13. It is contemplated, of course, that the entrances and exits may be arranged in any manner desired other than here shown, but it is believed that the present arrangement is convenient.

What is claimed is:

1. An outdoor theater for vehicles comprising a stage, a generally concaved surface located in front of the stage, spaced driveways on said surface, a parking area located on each side of each driveway, the area in front of each driveway being inclined upwardly therefrom and the area in the rear of each driveway being inclined downwardly therefrom in such a manner that the occupants of the vehicle parked on said parking areas will have an unobstructed view of the stage.

2. A drive-in theater for vehicles comprising a generally concaved surface, an arrangement of driveways and parking areas thereon, said areas being arranged in pairs between adjacent driveways and inclined with respect to the concavity of the surface to provide a clear view, the inclination of said areas relative to the driveways being such that the vehicles may drive on and off such areas.

LOUIS P. JOSSERAND.